(12) United States Patent
Schmitz

(10) Patent No.: US 7,887,249 B2
(45) Date of Patent: Feb. 15, 2011

(54) INTERNAL FINGER JOINT

(75) Inventor: Chad D. Schmitz, Arlington, WA (US)

(73) Assignee: The Boeing Company, Chicago, IL (US)

( * ) Notice: Subject to any disclaimer, the term of this patent is extended or adjusted under 35 U.S.C. 154(b) by 1048 days.

(21) Appl. No.: 11/424,246

(22) Filed: Jun. 15, 2006

(65) Prior Publication Data

US 2007/0289248 A1 Dec. 20, 2007

(51) Int. Cl.
*E04B 1/26* (2006.01)

(52) U.S. Cl. ............... 403/364; 52/71; 52/631; 52/793.1; 220/62

(58) Field of Classification Search ......... 403/339, 403/340, 364, 391; 229/198.2, 930, 931; 220/6, 7, 62, 682; 446/478; 33/565, 613, 33/645; 24/543; 29/521; 281/21.1, 29, 34–38; 402/73, 74, 76, 77; 52/69, 71, 631, 793.1
See application file for complete search history.

(56) References Cited

U.S. PATENT DOCUMENTS

| | | | | |
|---|---|---|---|---|
| 1,602,164 A | * | 10/1926 | Overbury | 52/557 |
| 2,142,305 A | | 1/1939 | Davis | |
| 3,122,302 A | * | 2/1964 | Wood | 206/154 |
| 3,341,908 A | * | 9/1967 | Lock | 403/381 |
| 3,456,380 A | * | 7/1969 | Cameron | 446/80 |
| 3,969,868 A | | 7/1976 | Bainter et al. | |
| 4,671,470 A | | 6/1987 | Jonas | |
| 4,715,592 A | * | 12/1987 | Lewis | 5/602 |
| 4,887,335 A | * | 12/1989 | Folkmar | 24/30.5 R |
| 5,125,133 A | * | 6/1992 | Morrison | 24/30.5 R |
| 5,331,758 A | * | 7/1994 | Romick | 40/661 |
| 5,357,728 A | * | 10/1994 | Duncanson | 52/592.4 |
| 5,509,212 A | * | 4/1996 | Henricksen | 33/565 |
| 5,653,003 A | * | 8/1997 | Freeman | 24/543 |
| 5,742,983 A | * | 4/1998 | Lo | 24/30.5 R |
| 5,940,935 A | * | 8/1999 | Julius | 16/269 |
| 6,164,477 A | | 12/2000 | Druckman et al. | |
| 6,251,497 B1 | * | 6/2001 | Hoopingarner et al. | 428/158 |
| 6,325,568 B1 | | 12/2001 | Druckman et al. | |
| 6,453,973 B1 | * | 9/2002 | Russo | 160/135 |
| 6,685,085 B2 | * | 2/2004 | Hanna | 229/148 |
| 6,948,651 B2 | * | 9/2005 | Ikeda | 229/103.2 |
| 6,968,971 B2 | | 11/2005 | Ely | |
| 7,013,535 B2 | * | 3/2006 | Tracy | 24/265 R |
| 7,188,456 B2 | * | 3/2007 | Knauseder | 52/592.1 |
| 7,302,150 B2 | | 11/2007 | Druckman | |
| 7,416,363 B2 | * | 8/2008 | Kozhuev | 403/364 |
| 7,534,501 B2 | * | 5/2009 | Durney | 428/596 |

FOREIGN PATENT DOCUMENTS

| | | |
|---|---|---|
| FR | 2409855 | 11/1977 |
| WO | WO 94/10406 | 5/1994 |
| WO | WO 2004/104314 A2 | 12/2004 |

\* cited by examiner

*Primary Examiner*—Michael P Ferguson
*Assistant Examiner*—Nahid Amiri

(57) ABSTRACT

A structural element comprises a groove formed in a sheet of foldable material. The groove substantially defines a fold line along which the sheet of material is foldable. At least one tab and at least one recess may be formed in the groove. The tab may be positioned on a side of the groove opposite the recess. The tab and recess may be oriented such that the tab is receivable within the recess positioned on an opposite side of the groove. The tab and recess may form an internal finger joint when the material is folded along the fold line.

7 Claims, 6 Drawing Sheets ated by folding the sheet of material shown in FIG. 7.
INTERNAL FINGER JOINT

TECHNICAL FIELD

This disclosure relates to the field of fabricating structural elements, such as those made of lightweight honeycomb composite materials found on modern aircraft. More particularly, this disclosure relates to a finger joint formed in foldable panels used to make structural elements that uses less glue than that used in prior joints.

BACKGROUND

Flexible, lightweight sheet goods, such as composite honeycomb panels, are widely used in a variety of applications in the aerospace industry to create enclosures, containers, boxes, and other structural elements useful on modern aircraft. For example, these panels can be used to create the overhead luggage bins found on today's passenger aircraft.

Single unitary panels made of such materials are usually bent into a desired shape. Typically, composite honeycomb panels are routed with a groove and then bent along the groove. Before bending the panel, the groove is filled with adhesive which forms a structural joint when the panel is bent into the desired shape. This technique is known as "ditch and pot" or "bend and fold." The groove that allows the panel to bend, however, creates a large void for adhesive to reside. The size of this void is more than necessary to create a strong joint. For example, on average, the glue in a 48 inch long 90° joint in a ½ inch panel will weigh 0.38 pounds. This technique of creating joints can thus add up to substantial excess weight across an entire airplane.

SUMMARY

This problem has been solved by a tab/slot geometry in a ditch/pot joint. Alternating tabs formed in one side of the groove enter corresponding recesses formed in the opposite side of the groove of a ditch/pot joint formed in the surface of a sheet of structural material. When the sheet of material is folded along the fold line defined by the groove, the tabs enter the corresponding recesses on the other side of the groove and displace the volume normally occupied by adhesive. The disclosed joint geometry thus will limit the amount adhesive the joint will accept. The adhesive will collect at the inner seam of the joint at the intersection between the two face sheets, thus bonding the two face sheets together to form a structural joint with a minimal amount of adhesive.

DETAILED DESCRIPTION

FIGS. 1 through 6 show a sheet 10 of foldable material of thickness t that can be used to make a structural element 5 such as a container, box, compartment, covering, or the like. The thickness t of the sheet 10 may, for example, be 0.375 inches to 0.5 inches. The invention is not limited to sheet of any particular thickness, however.

The material may be a piece of honeycomb 13 composite comprising a core of NOMEX®, KEVLAR®, or paper-like material shaped into a matrix of cells resembling a honeycomb 13. The core is sandwiched between two face sheets that illustratively can be made of KEVLAR®, fiber glass, carbon fiber, aluminum, or other material. The principles of the invention may also be applied to sheets 10 made of materials other than honeycomb 13 composite, for example, sheets 10 made of rigid foam materials.

Figure 1:
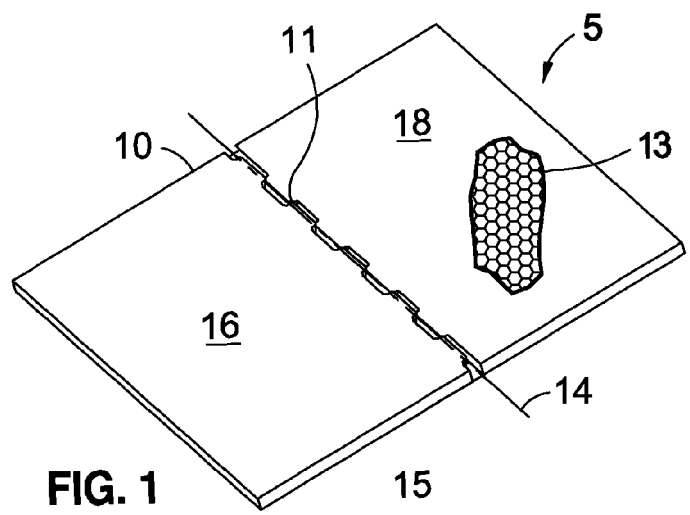
FIG. 1 shows a flat unfolded sheet of structural material into which an illustrative finger joint in accordance with the invention has been fabricated.

Sheets of structural material like the sheet 10 in FIG. 1 are illustratively useful in making lightweight structural elements used on aircraft such as overhead luggage bins and the like. The invention is not limited, however, to any particular sheet material or application. The invention may be used to create any item that can be made by folding a sheet of material to a desired shape or configuration. The material can be any foldable sheet material that can provide the required structural integrity for the finished product.

Figure 2:
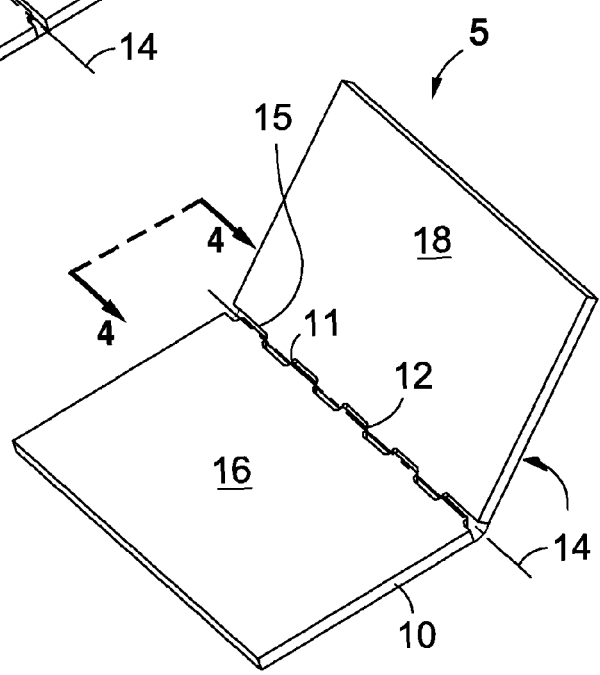
FIG. 2 shows the sheet of structural material of FIG. 1 partially folded along a fold line defined by the finger joint.
Figure 3:
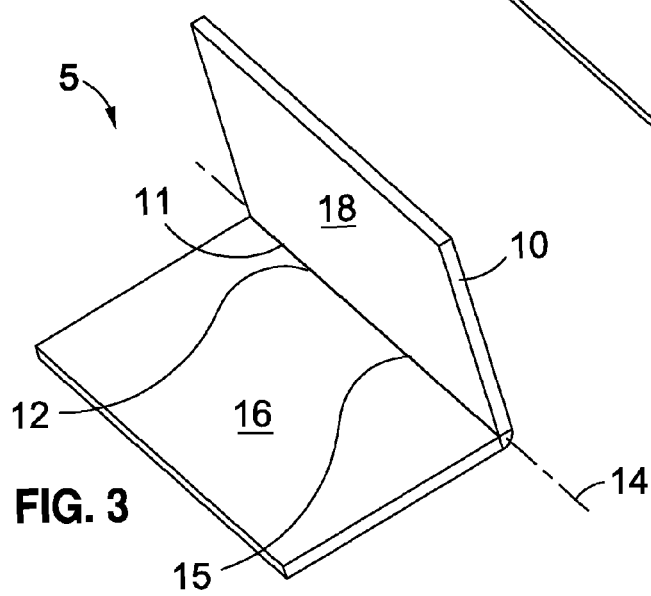
FIG. 3 shows the sheet of structural material of FIG. 1 completely folded into a desired shape along a fold line defined by the finger joint.
Figure 4:
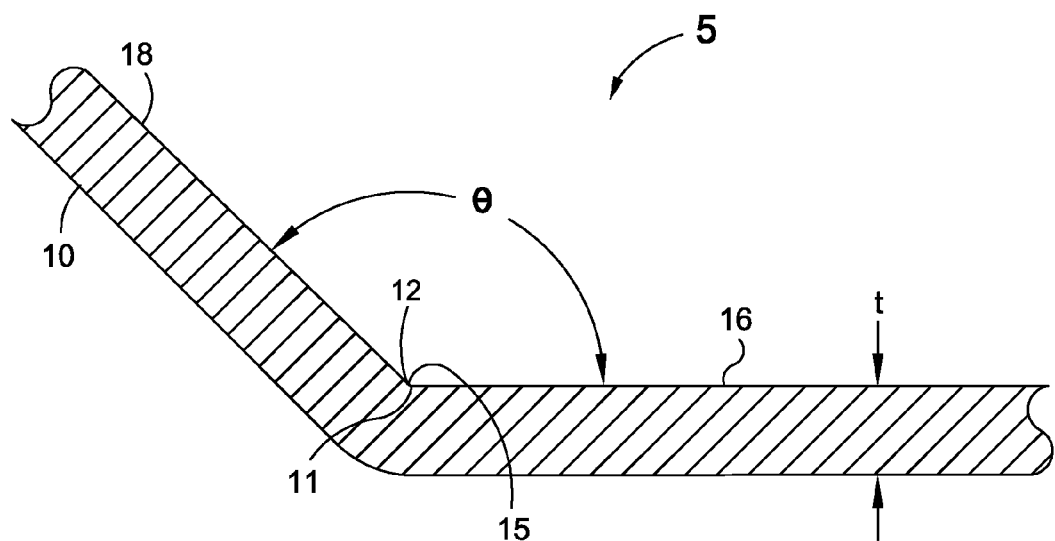
FIG. 4 shows an edge view of the joint of FIG. 1.

FIG. 1 shows the sheet 10 in a completely unfolded state. FIG. 2 shows the sheet 10 in a partially folded, intermediate state. FIG. 3 shows the sheet 10 in its final folded condition. The sheet 10 has an internal joint 12 in accordance with this invention formed in one of the flat surfaces of the sheet 10. The joint 12 divides the sheet 10 into two panels or sections 16 and 18 joined together at a fold line 14. The joint 12 is a serpentine groove 11 of predetermined width machined to a predetermined depth into the surface of sheet 10. The width and depth of the groove 11 is such that the sheet 10 can be folded into a desired configuration and there is enough material joining the two panels 16 and 18 to maintain the structural integrity of the finished structural element 5.

The joint 12 substantially defines a fold line 14 along which the sheet 10 is folded. As noted above, the joint 12 separates the sheet 10 into two flat panels 16 and 18 at the fold line 14. When the sheet 10 is folded, the two panels 16 and 18 are connected at the joint 12 and form an interior angle θ, as shown most clearly in FIG. 4. The angle θ can be, for example, 30° to 135°, or any other desired angle. Adhesive 15 may be introduced into part or all of the groove 11 before the sheet is folded to strengthen the joint between the panels 16 and 18.

Figure 5:
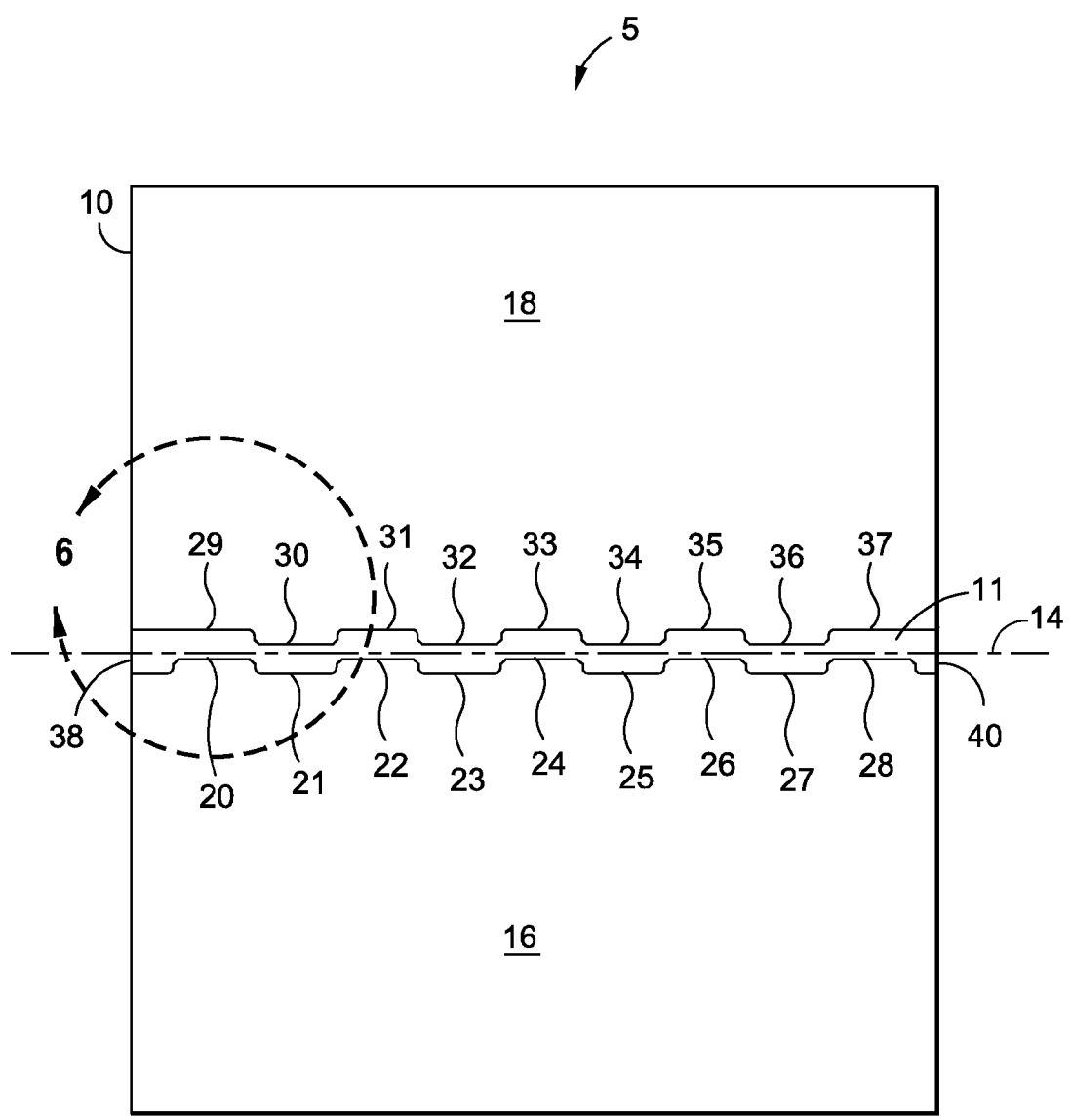
FIG. 5 is a top view of the sheet of FIG. 1 showing more detail of the joint.
Figure 6:
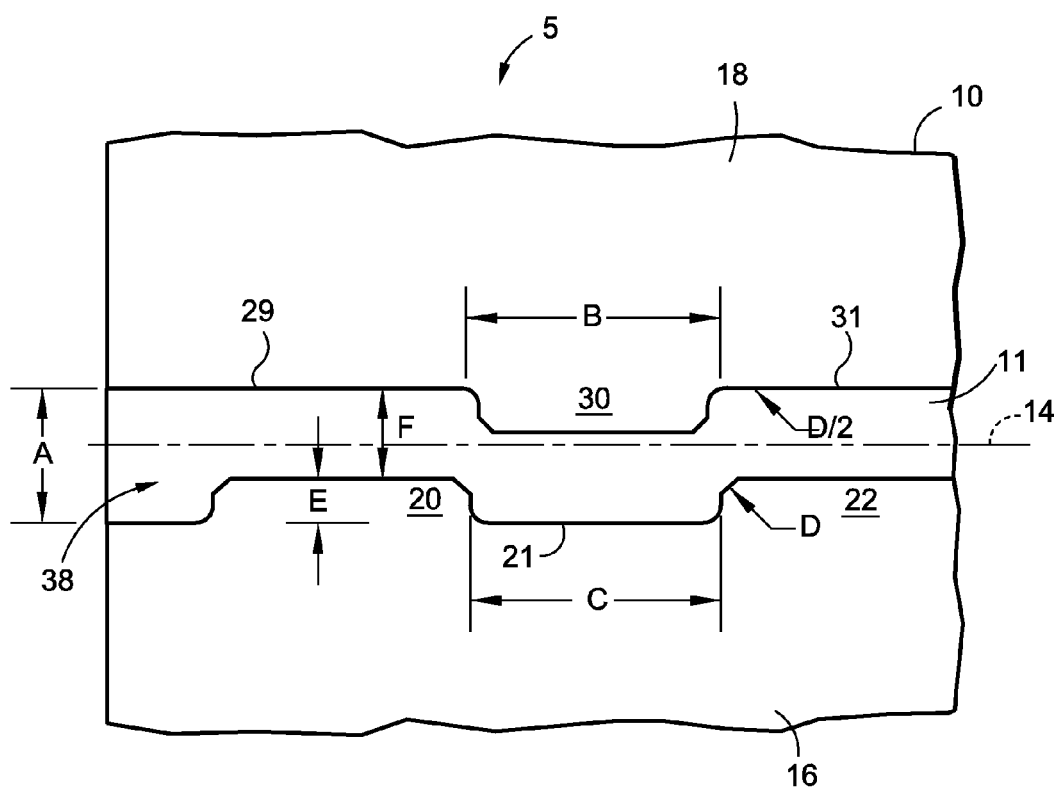
FIG. 6 is a detailed view of a part of the groove located in the dotted box in FIG. 5.

As shown most clearly in FIGS. 5 and 6, the meandering of the serpentine groove 11 in the sheet 10 results in the creation of a row of tabs 20, 22, 24, 26, and 28 in one of the two sidewalls of the groove 11. A row of recesses 21, 23, 25, and 27 in that one sidewall are located between adjacent tabs 20, 22, 24, 26, and 28. The other sidewall of the groove 11 contains similar tabs 30, 32, 34, and 36 and recesses 29, 31, 33, 35, and 37 so that each tab on one side of the groove 11 is opposite a recess on the other side of the groove 11. The rows of tabs and recess in groove 11 extend between two edge regions 38 and 40 of groove 12. Illustratively, the width of the edge regions 38 and 40 (dimension A in FIG. 6) can be about 0.2945 inches to 1.3090 inches. Dimension B may be 1.5 inches, dimension C may be 1.75 inches, dimension D may be 0.25 inches, dimension E may be 0.0982 inches to 0.4363 inches, and dimension F may be 0.1963 inches to 0.8727 inches. None of these illustrative dimensions is meant to be in any way limiting, however.

In some applications, prior to folding the sheet 10, a bead of adhesive 15 may be run in part or all of the groove 11 to reinforce the joint 12. In prior ditch and pot joints, excess adhesive had a tendency to collect in the joint 12 which increased the weight of the finished article. This weight increase is important in many industries, particularly in the aerospace industry, where weight reduction is of paramount concern. The shape and configuration of the groove 11 in accordance with this invention, however, is such that excess adhesive is forced out of the joint 12 by the entry of the tabs into the recesses when the sheet 10 is folded into its final configuration. This excess adhesive can then be removed which will result in a meaningful weight reduction. In some low stress applications, the use of adhesive may even be dispensed with altogether and the structural elements may be assembled dry, thus further increasing the weight savings achieved by this invention.

Figure 7:
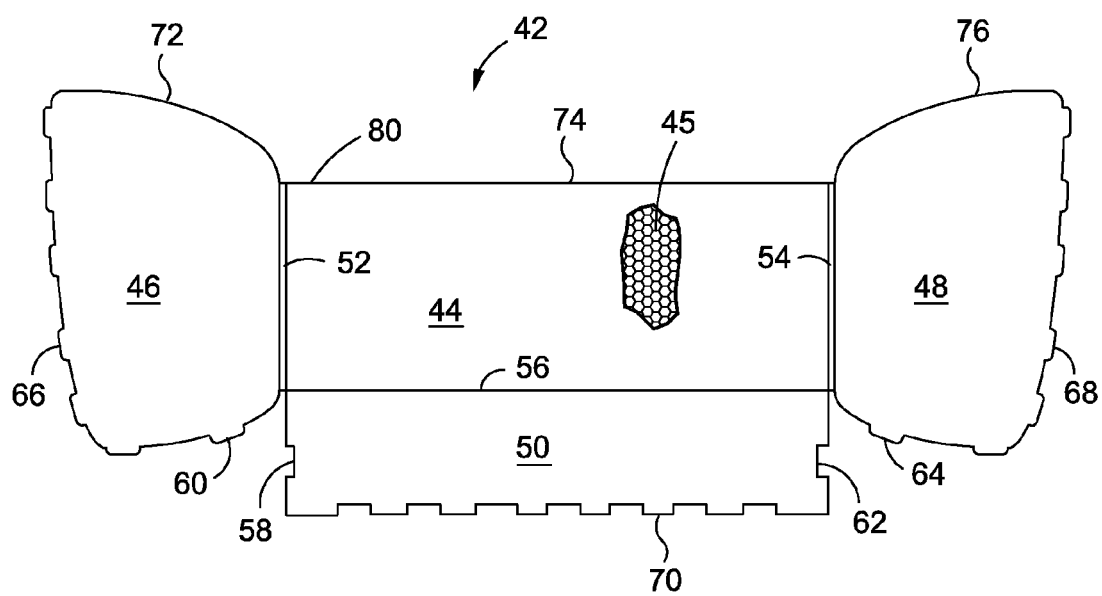
FIG. 7 is an unfolded sheet of structural material that can be folded to create the luggage bin.
Figure 8A:
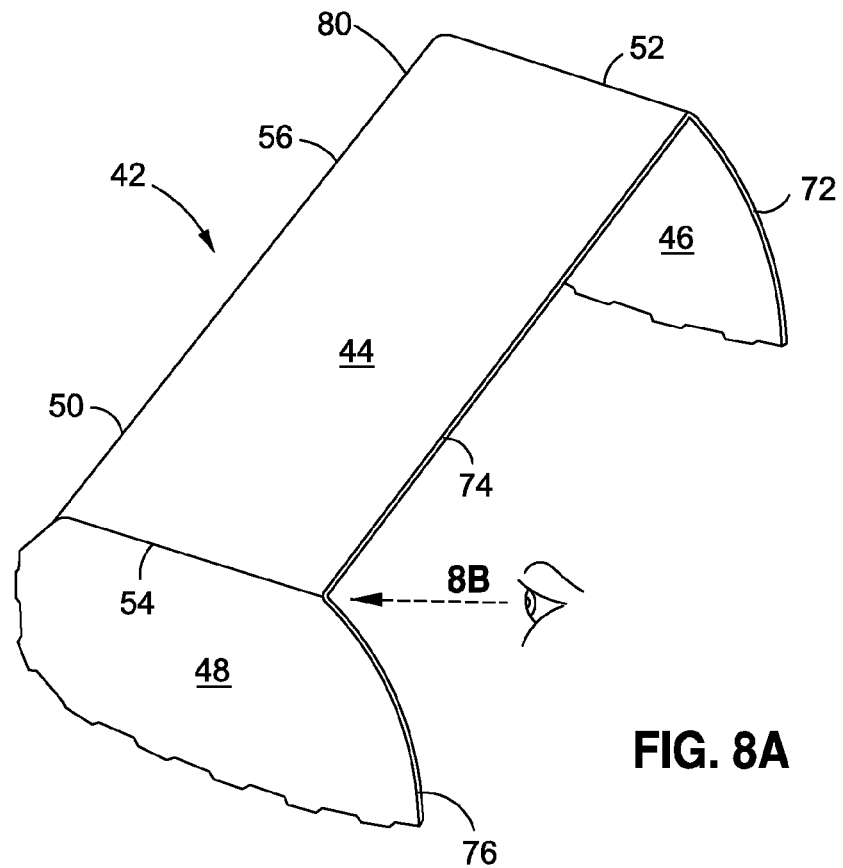
FIG. 8A shows an aircraft overhead luggage bin illustratively utilizing finger joints in accordance with the invention created by folding the sheet of material shown in FIG. 7.
Figure 8B:
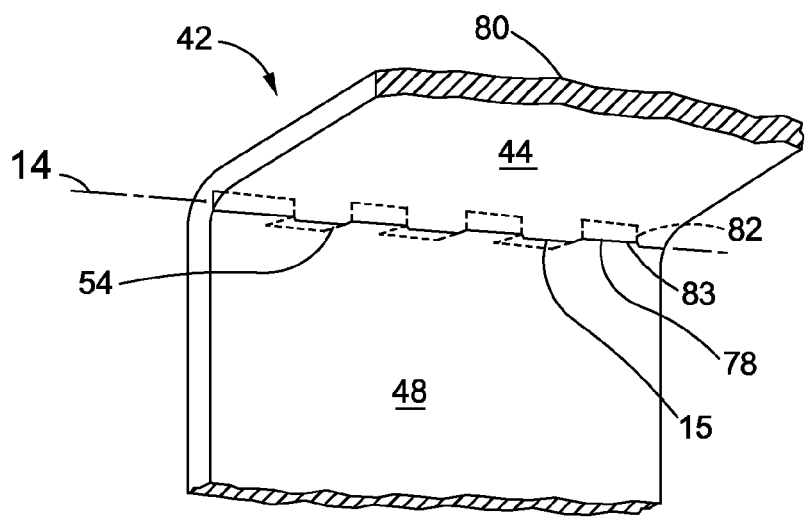
FIG. 8B is a perspective illustration taken along line 8A and illustrating an adjoining pair of sections of the unitary sheet folded along the fold line.

FIGS. 7, 8A and 8B show an illustrative aircraft overhead storage bin 80 constructed in accordance with this invention. FIG. 7 shows a unitary sheet 42 of structural material, such as a suitable honeycomb 45 composite, comprising a top panel 44 joined to two side panels 46 and 48 and a back panel 50. The panels 46, 48, and 50 are joined to panel 44 by means of joints 52, 54, and 56, respectively, each of which is configured like the joint 12 described above. The joints 52, 54, and 56 each comprise a serpentine groove 78 (FIG. 8B) formed in the sheet 42 that defines a series of tabs 82 (FIG. 8B) and recesses 83 (FIG. 8B) that come together as described above when the sheet 42 in FIG. 7 is folded along the joints 52, 54, and 56 to create the overhead bin 80 of FIG. 8A. Adhesive 15 (FIG. 8B) may be introduced into all or part of any of the joints 52, 54, and 56 for reinforcement depending on the stresses expected on the overhead bin. Edge 58 of back panel 50 and edge 60 of side panel 46 are joined together as are edge 62 of back panel 50 and edge 64 of side panel 48 using conventional mortise and tenon joints such as those disclosed in U.S. Pat. Nos. 6,164,477 and 6,325,568. Edges 66, 68, and 70 are joined to corresponding edges of a suitably curved bottom panel of the stowage bin not shown in FIGS. 7 and 8A using similar mortise and tenon joints. A hinged and latchable door not shown in FIGS. 7 and 8A is attached in conventional fashion to the front edge 74 of panel 44. The door secures the contents of the storage bin 80 for flight by closing the storage bin along edges 72, 74, and 76 shown in FIGS. 7 and 8A and along a front edge of the bottom panel not shown in FIGS. 7 and 8A.

FIG. 8B is an illustration of the storage bin 80 taken along line 8B of FIG. 8A and illustrating an interior of a portion of the joint 54 between the adjoining pair of panels (i.e., sections) 44, 48. As can be seen in FIG. 8B, the groove 78 may be formed in the unitary sheet 42 such that the unitary sheet 42 may be folded along the fold line 14. As indicated above, the joint 54 may comprise a serpentine groove 78 formed in the sheet 42 that defines a series of tabs 82 and recesses 83 that come together as described above when the sheet 42 in FIG. 7 is folded along the joint 54 to create the overhead bin 80 of FIGS. 8A-8B. As described above, adhesive 15 may be introduced into the groove joint 54 before the sheet 42 is folded such that that adhesive 15 strengthens the joint 54.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

The invention claimed is:

1. A structural element, comprising:
a groove formed in a unitary sheet of foldable material, the groove substantially defining a fold line along which the unitary sheet of material is foldable, the unitary sheet having first and second sections separated by the groove; and
a row of tabs extending along one of two sidewalls of the groove and a row of recesses extending along the other sidewall of the groove, the tabs being positioned on a side of the groove opposite the recesses;
the tabs and recesses being oriented such that the tabs are receivable within the recesses positioned on an opposite side of the groove when the material is folded along the fold line, the tabs and recesses forming an internal finger joint when the material is folded along the fold line.

2. The structural element of claim 1, wherein:
the sheet of foldable material comprises honeycomb composite material.

3. The structural element of claim 1, further comprising:
an adhesive receivable within at least a portion of the groove between the tab and the recess.

4. A structural element, comprising:
a unitary sheet of foldable material; and
at least one serpentine groove formed in the unitary sheet and defining a fold line along which the sheet may be folded;
the unitary sheet having first and second sections separated by the groove;
the groove defining a row of tabs and a row of recesses, the tabs extending along one of two sidewalls of the groove, the recesses extending along the other sidewall of the groove, the tabs and recesses being oriented such that the tabs are receivable within the recesses positioned on an opposite side of the groove when the material is folded along the fold line to form an internal finger joint;
the unitary sheet being folded along the fold line such that the first and second sections form an angle with respect to each other.

5. The structural element of claim 4, further comprising:
a bead of adhesive deposited within at least a portion of the groove prior to folding the unitary sheet.

6. The structural element of claim 4, wherein:
the unitary sheet of foldable material comprises honeycomb composite material.

7. The structural element of claim 4, wherein:
the unitary sheet is sized and configured to be formed into at least a portion of an overhead luggage bin of an aircraft.

* * * * *